United States Patent [19]

Bouchard

[11] Patent Number: 5,299,880
[45] Date of Patent: Apr. 5, 1994

[54] ENGINE COUPLER AND ADAPTER

[76] Inventor: Daurent J. Bouchard, 303 Popular, College Station, Tex. 77840

[21] Appl. No.: 959,352

[22] Filed: Oct. 13, 1992

[51] Int. Cl.⁵ ............................................. F16D 1/06
[52] U.S. Cl. ...................................... 403/3; 403/337; 403/287; 403/24; 74/606 R
[58] Field of Search ...................................... 403/3-4, 403/335 ∝ 338, 287, 300, 301, 24; 123/195 A; 74/606 R

[56] References Cited

U.S. PATENT DOCUMENTS

| | | | |
|---|---|---|---|
| 2,873,587 | 2/1959 | Lyritzis | 403/337 X |
| 2,879,092 | 3/1959 | Hargrove et al. | 403/337 |
| 3,550,713 | 12/1970 | Swanson | 180/294 |
| 3,902,333 | 9/1975 | Dossier | 464/182 X |
| 4,086,012 | 4/1978 | Buckley et al. | 403/337 X |
| 4,121,532 | 10/1978 | Coryell, III | 403/337 X |
| 4,478,593 | 10/1984 | Brown | 74/606 R X |
| 4,641,547 | 2/1987 | Stich et al. | 74/606 R |

Primary Examiner—Randolph A. Reese
Assistant Examiner—Harry C. Kim
Attorney, Agent, or Firm—Kenneth A. Keeling

[57] ABSTRACT

An engine coupler and adapter for installing an automobile engine into a vehicle in which a rear mounted engine was originally installed. The coupler comprises a body which is an elongated hollow cylinder, a mounting flange at one end of the cylinder for mounting the coupling device to the flywheel of a transaxle, and a mounting flange mounted at the opposing end of the cylinder shaft for mounting the coupler to an automobile engine crankshaft gear. The flanges, each of which is positioned at a right angle to the cylinder axis, consist of cylindrical disks. Each of the flanges contain properly positioned and shaped apertures to enable the flanges to be attached to the transaxle flywheel and the automobile engine crankshaft gear respectively. Threading is provided interior of the hollow cylinder for threadable connection of the coupler to a transaxle gland nut. An adapter is provided to connect differently-configured flywheel housing components.

2 Claims, 2 Drawing Sheets

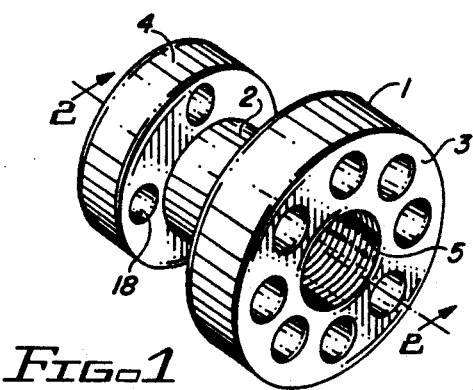
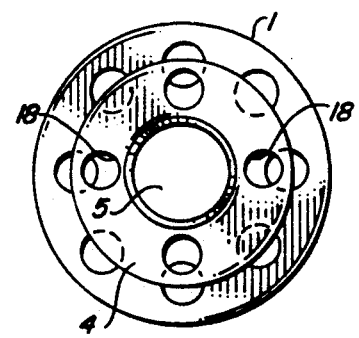
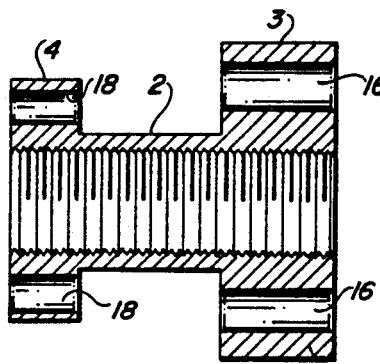
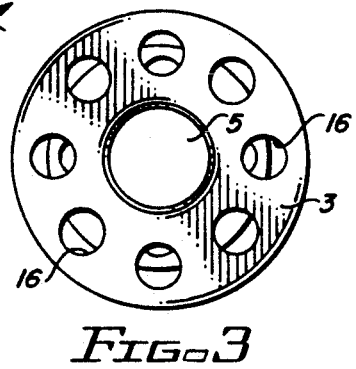
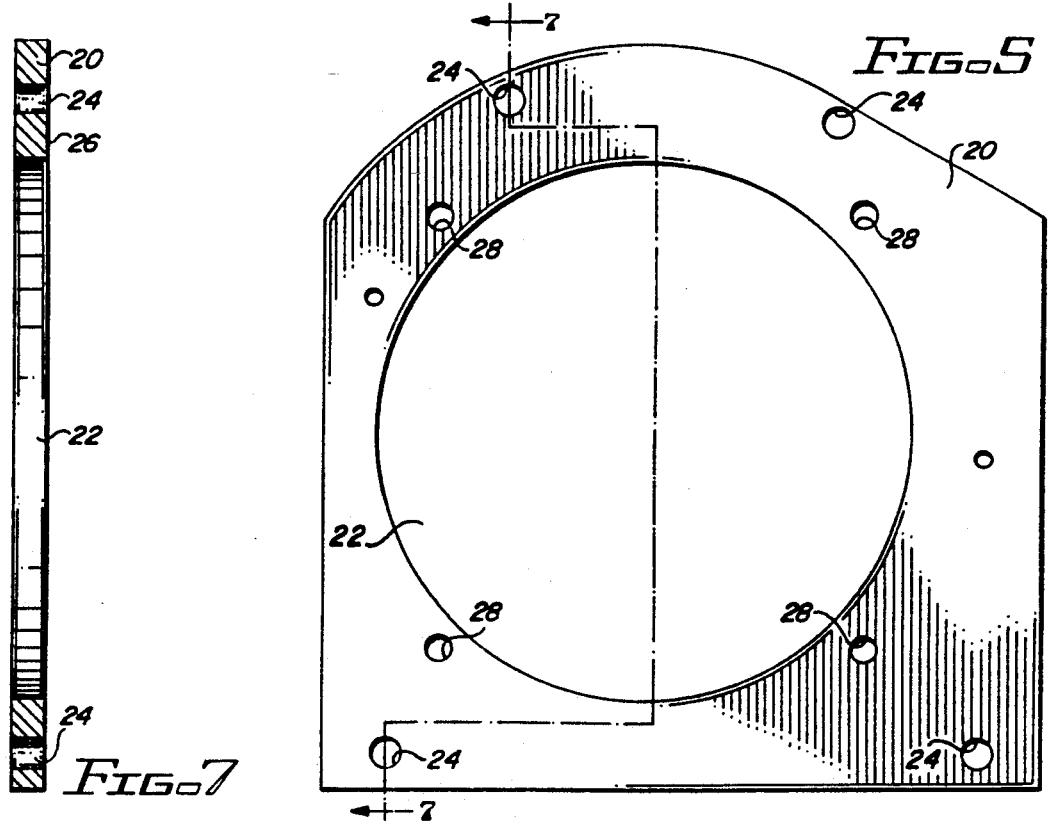

ENGINE COUPLER AND ADAPTER

BACKGROUND OF THE INVENTION

1. Field of the Invention

This invention relates in general to coupling of engines to unrelated automobiles and more particularly to a coupler and adapter for mounting an automobile engine to a vehicle in which a rear-mounted engine was originally installed.

2. Description of the Prior Art

It is frequently desirable to replace an originally installed automobile engine with an automobile engine manufactured by an unrelated company. Reasons for replacing an automobile engine with an engine manufactured by others include enhancement of motive power and compliance with increasingly stringent emission control regulations.

Various approaches have been utilized to connect an internal combustion engine to an unrelated vehicle. Such approaches include insertion of an engine and a related transmission into a vehicle with the connection between the unrelated parts to be made at or near the drive shaft and connection of a flywheel associated with the engine to a flywheel associated with a transmission.

For many years models of VOLKSWAGEN[1] automobiles were sold within the United States which were powered by horizontally-opposed air-cooled four-cylinder engines. The engines have been characterized as possessing comparatively low horse power ratings, relatively short engine life and relatively high pollution emissions.

[1] Various manufacturers of automobile engines or parts are identified herein by capitalizing the name and/or mark associated with such manufacturers.

When emission controls were instituted, the United States Government restricted sale and import of VOLKSWAGEN automobiles containing air-cooled engines into the United States. At the present time there are a number of VOLKSWAGEN automobiles within the United States containing such air-cooled engines. There is a relatively high cost to install new VOLKSWAGEN engines or rebuild the existing engines. While it is desirable to replace the VOLKSWAGEN engines, the limited space available in the VOLKSWAGEN engine compartment and the necessity of connection to a transaxle has prohibited successful development of a suitable replacement. (It is noted that transaxle is a combination of the terms transmission and axle referring to the combination of the transmission with rear axle members.)

A number of patents are representative of the prior art of features permitting adaptation of different engine components to engines and of connecting aligned shafts:

Brown U.S. Pat. No. 4,478,593 describes a connector plate disposed between a powered flywheel related to an engine and a transmission flywheel related to a transmission assembly. The Brown invention is useful in connecting a PERKINS 4-154 diesel engine to a FORD MUSTANG transmission, the engine and the transmission each having a flywheel, the flywheels being of similar size, the original and replacement engines being constructed in contemplation of insertion in a front-mounted engine with rear wheel drive and then-conventional drive train. The Brown disclosure, while useful for the type of application disclosed, is not adaptable for use in installing a replacement engine in a vehicle having a rear-mounted engine as disclosed in the present invention. A flywheel-to-flywheel connection as disclosed in Brown would not be practicable in the limited space available in VOLKSWAGEN BEETLES and like applications. Brown further does not disclose a means of connecting an engine to an unrelated transaxle without use of a flywheel related to the engine.

Wiseman U.S. Pat. No. 2,899,042 describes a coupling means for a screw conveyor, the said coupling means being used to couple adjoining flights of a screw conveyor. The Wiseman coupling means includes a spool flange placed between the adjoining flights and flanged cylindrical elements placed on each of the adjoining flights for connection with the spool flange. The Wiseman concept, although useful for screw conveyors, is not applicable for connection of an engine to a flywheel as described in the present invention. The Wiseman disclosure, like others identified, has application, with limitations, to aligned shafts.

Stich U.S. Pat. No. 4,641,547 describes a method and apparatus for installing a replacement automatic transmission in place of an original automatic transmission in a four-wheel drive vehicle. The adapter kit described in this invention enables the removal of an original General Motors automobile transmission and the replacement with another type and style General Motors transmission.

Shook U.S. Pat. No. 3,122,029 describes an adapter which enables a transmission overdrive kit to be installed on a four-wheel drive vehicle. Such an adapter is merely an attachment to the existing transmission and drive-train of the four-wheel drive vehicle which enables another gear to be placed in the path for power to be transferred from the engine to the wheels of the vehicle, thus enabling it to travel at higher speeds on the highway.

Baratti U.S. Pat. No. 4,362,065 discloses a replacement starting motor assembly for automobiles.

Bradley U.S. Pat. No. 4,155,266 discloses a support housing for adapting automobile starter motors to aircraft engines.

Johnson U.S. Pat. No. 3,772,938 discloses a deflector plate and bell housing for installation on vehicles having different starter motor positions.

Rasset U.S. Pat. No. 4,135,478 discloses a modular engine construction permitting adaptation to different types of engine configurations.

Buckley et al U.S. Pat. No. 4,086,012 discloses a rotational energy absorbing coupling for shaft to shaft and shaft to crank applications using a plurality of shear pins.

Hargrove U.S. Pat. No. 2,879,092 discloses a friction shaft coupling assembly for coupling rotors of an elastic fluid turbine.

Dossier U.S. Pat. No. 3,902,333 discloses an elastic coupling adapted to first and second bodies moveable in rotation around substantially aligned axes.

Corona U.S. Pat. No. 3,990,802 describes an electric motor having a removable shaft assembly.

Gredell U.S. Pat. No. 2,585,113 discloses a shear pin coupling for aligned shafts for use on a propeller shaft of a marine engine, the coupling including flanged cylindrical elements placed over each of the aligned shafts and bolted together at the flanges.

This prior art does not solve the problem of adapting automobile engines to be mounted in automobiles containing rear-mounted engines.

SUMMARY OF THE INVENTION

One of the objects of this invention is to provide a coupler and adapter for adapting an engine to a transaxle of a vehicle having a substantially different engine.

Another object of the invention is to provide a coupler and adapter for mounting water-cooled engines to the transaxles of vehicles equipped with air-cooled engines.

Another object of the invention is to provide a coupler and adapter for mounting water-cooled engines to the transaxles of VOLKSWAGENS equipped with air-cooled engines.

Other objects of the invention will become apparent from time to time throughout the specifications and claims as hereinafter related.

These and other objects of the invention are accomplished by an engine coupling device and adapter which allows an automobile engine to be mounted in an unrelated automobile. The coupling device comprises a hollow cylinder with a flange on a first end for mounting the device to an automobile transaxle flywheel and a flange on an opposing second end for mounting to an automobile engine crankshaft. The body of the coupling device further includes a threaded interior surface for threaded connection to a gland nut associated with the transaxle. The flange at the first end is in the shape of a circular disk through which properly spaced and shaped apertures exist for the purpose of fastening the flange to the flywheel transaxle of the automobile. The flange on the opposing second end of the coupling device is for mounting to the automobile engine crankshaft gear and is in the form of a circular disk through which properly spaced and shaped apertures exist for the purpose of mounting the coupling device to the automobile engine. An adapter is provided for connection of unrelated flywheel housing components.

BRIEF DESCRIPTION OF THE DRAWINGS

FIG. 1 is an isometric view of the coupling device of a preferred embodiment of this invention.

FIG. 2 is a cross-sectional view along lines 2—2 of FIG. 1.

FIG. 3 is an end view showing the engine crankshaft gear mounting flange of the device shown in FIG. 1.

FIG. 4 is an end view showing the flywheel mounting flange of the coupling device shown in FIG. 1.

FIG. 5 is a front view of an adapter of a preferred embodiment of this invention.

FIG. 6 is a top view of the adapter of FIG. 5.

FIG. 7 is a cross-sectional view along line 7—7 of FIG. 5.

DESCRIPTION OF THE PREFERRED EMBODIMENT

Figure 8:
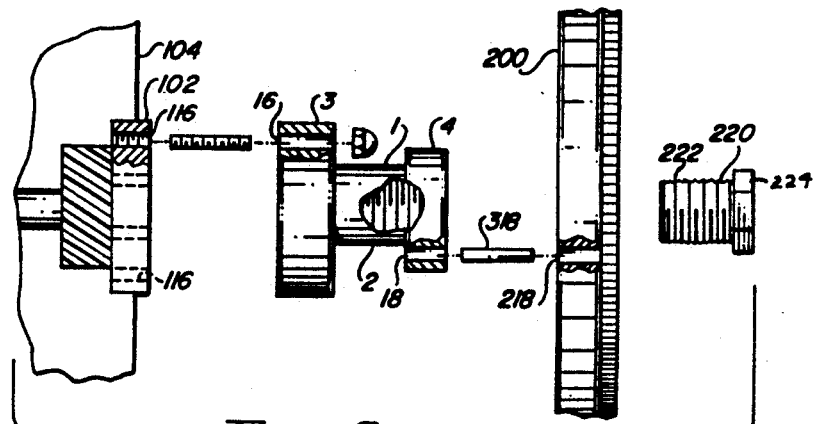
FIG. 8 is a frontal view of the coupling device in relation to a crankshaft gear and a flywheel.

Referring to the drawings by numerals of reference, and more particularly to FIG. 1, there is shown a coupling device 1 for coupling an engine to an unrelated transaxle. The coupling device 1 is of a cylindrical, spool-like construction and comprises a body 2, a transaxle mounting flange 4, and an engine mounting flange 3. In the preferred embodiment the coupling device 1 is constructed of steel although other materials suitable for engine parts may be used. The body 2 is an elongated hollow cylinder having a longitudinal center axis. The transaxle mounting flange 4 comprises a circular disk. The transaxle mounting flange 4 is attached to and integral with a first end of the body 2 and is positioned at a right angle to and centered about the longitudinal center axis of the body 2.

The engine mounting flange 3 also comprises a circular disk. The engine mounting flange 3 is attached to and integral with the distal second end of body 2 and is positioned at a right angle to and centered about the longitudinal central axis of the body 2.

Referring to FIG. 4 it may be seen that flange 4 is provided with a central aperture 5 aligned with the longitudinal center axis of the body 2. Referring to FIG. 3 it may be further seen that mounting flange 3 is also provided with a central aperture 5 aligned with the longitudinal center axis of the body 2.

Referring now to FIG. 2 a cross-sectional view of the coupling device 1 is depicted. It may be seen from FIG. 2 that the flange 2 and the flange 4 are parallel and that the interior of cylindrical body 2, coinciding with the aperture 5 provided in flanges 3 and 4 is provided with threading, aperture 5 extends through mounting flange 4, body 2 and mounting flange 3.

Referring again to FIG. 4 transaxle mounting flange 4 has a plurality of circular apertures 18 in spaced relationship around the flange, said apertures 18 extending through the flange and each aperture 18 having a longitudinal axis parallel to the longitudinal axis of the cylindrical body 3. The apertures 18 are each radially spaced an equal distance from the longitudinal axis of the coupling device 1 and are angularly spaced an equal distance from each other.

Referring again to FIG. 3, the engine mounting flange 3 has a plurality of circular apertures 16, each such circular aperture 16 having a longitudinal axis parallel to the longitudinal axis of the cylindrical body 2. Each of the aperture 16 are radially spaced an equal distance from the longitudinal axis of the coupling device 1 and are angularly spaced an equal distance from each other.

Referring now to FIG. 5 the adapter 20 of the present invention is depicted. The adapter 20 comprises a flat metal plate, constructed of steel in the preferred embodiment, said adapter 20 being a generally rectangular configuration but having an outwardly curving upper surface. The exterior dimensions of adapter 20 are determined by the larger of the respective housings to which adapter 20 is connected.

A central orifice 22 is provided in adapter 20. Said central orifice 22 is larger than the external diameter of flange 3 of coupling device 1.

FIG. 6 illustrates a top view of adapter 20 showing that adapter 20 is a flat, generally rectangular plate.

Referring again to FIG. 5, a plurality of apertures 24 are provided in adapter 20. The central axis of the apertures 24 are perpendicular to the flat surface 26 of adapter 20. Still referring to FIG. 5, a series of apertures 28 are additionally provided in adapter 20. The central axis of apertures 28 are perpendicular to the flat surface 26 of adapter 20.

Referring to FIG. 7 a cross-sectional side elevation of adapter 20 is depicted along the line 7—7 of FIG. 5. FIG. 7 depicts the central aperture 22 of adapter 20 as well as two of the apertures 24.

Referring now to FIG. 8 the installation of the coupling device 1 in relation to the engine crankshaft gear 102 and transaxle flywheel 200 is depicted. Engine crankshaft gear 102 and an illustrative partial depiction of engine 104 are depicted in FIG. 8. Engine crankshaft gear 102 comprises a generally cylindrical body. Mounting flange 3 is so sized in external diameter as to coincide generally with the exterior diameter of crankshaft gear 102. The apertures 16 provided in mounting flange 3 are sized and spaced so as to coincide with apertures 116 provided in crankshaft gear 102. Aligned apertures 16 and 116 allow mounting flange 3 to be securely bolted to crankshaft gear 102 with the central axis of coupling device 1 axially aligned the central axis of crankshaft gear 102.

Still referring to FIG. 8, the flywheel 200 is depicted together with gland nut 220. Apertures 218 are provided in flywheel 200. Apertures 18 provided in mounting flange 4 are so sized and so arranged as to coincide with apertures 218 provided in flywheel 200. Guide pins 318 are provided for insertion through coinciding apertures 18 and 218, such guide pins 318, upon insertion, extending through aperture 18 and to aperture 218. Gland nut 220 is a hollow cylindrical member having external threads 222 and a mounting head 224. Gland nut 224 upon installation, extends through a central aperture (not shown) provided in flywheel 200.

The external threading 222 of gland nut 220 is so sized as to be threadably inserted into the threading provided in central aperture 5 of coupling device 1. Upon insertion of guide pins 318 and threaded connection of gland nut 220 to coupling device 1, coupling device 1 is fixedly attached to flywheel 200.

Figure 9:
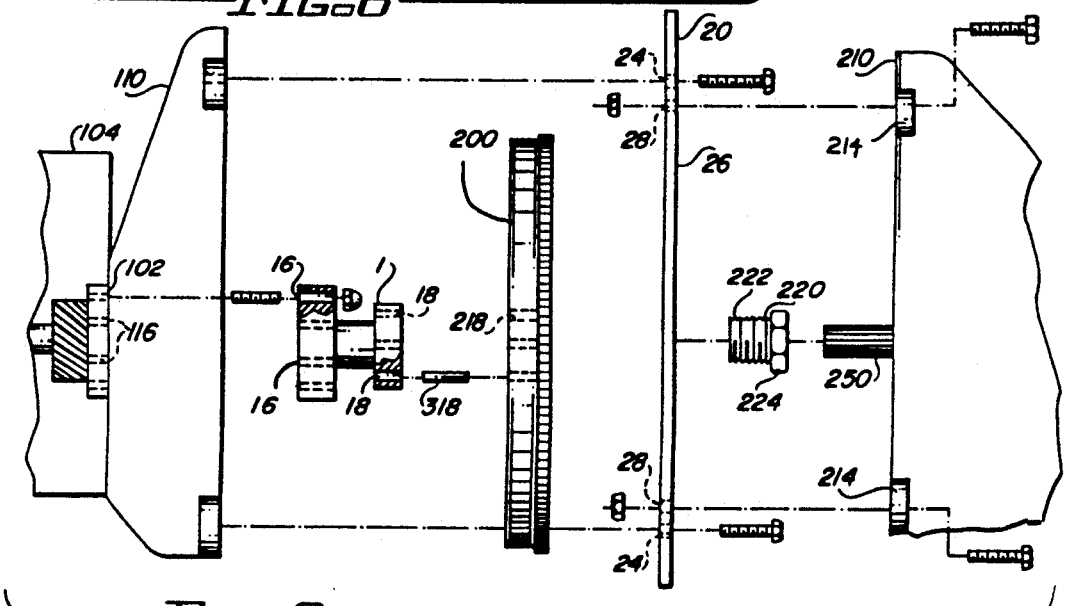
FIG. 9 is a frontal view of the coupling device in relation to the adapter and unrelated housing components.

Referring now to FIG. 9, the coupling device 1 of the present invention is depicted in relation to crankshaft gear 102, an illustrative schematic of engine 104, flywheel 200, housing component 110, housing component 210, and adapter 20. Housing component 110 comprises a housing for a flywheel connected to engine 104 said housing component 110 being provided as original equipment for connection to engine 104. Housing component 110 provides a protective cover for the flywheel (not shown) originally designed to be used with engine 104.

Housing component 210 comprises a housing component originally provided for use with the transaxle and provided to house flywheel 200. Apertures 24 provided in adapter 20 are so sized and so aligned as to coincide with apertures provided in bolt receiving flanges 114 of housing 110. Likewise, apertures 28 provided in adapter 20 are so sized and so aligned as to correspond with apertures provided in bolt receiving flanges 214 provided in housing 210.

Still referring to FIG. 9, it may be seen that the coupling device 1 connects the flywheel 200 and the crankshaft gear 102 as previously described in discussion of FIG. 8. The central aperture 22 provided in adapter 20 is large enough to allow adapter 20 to slide over the exterior of flywheel 200 for attachment to housing component 110. Upon attachment of coupling device 1 to engine crankshaft gear 102 and flywheel 200, adapter 20 may be bolted to housing component 210 and thereafter bolted to housing component 110. It is noted that drive shaft 250, a component of the transaxle, is aligned with the central opening provided in gland nut 220. A bearing race (not shown) is provided internally of gland nut 220, the interior bearing race allowing for rotational movement of drive shaft 250 within gland nut 220. The details of the interior of gland nut 220 and drive shaft 250 are not illustrated in the drawings as such components are standard equipment provided with a transaxle.

Figure 10:
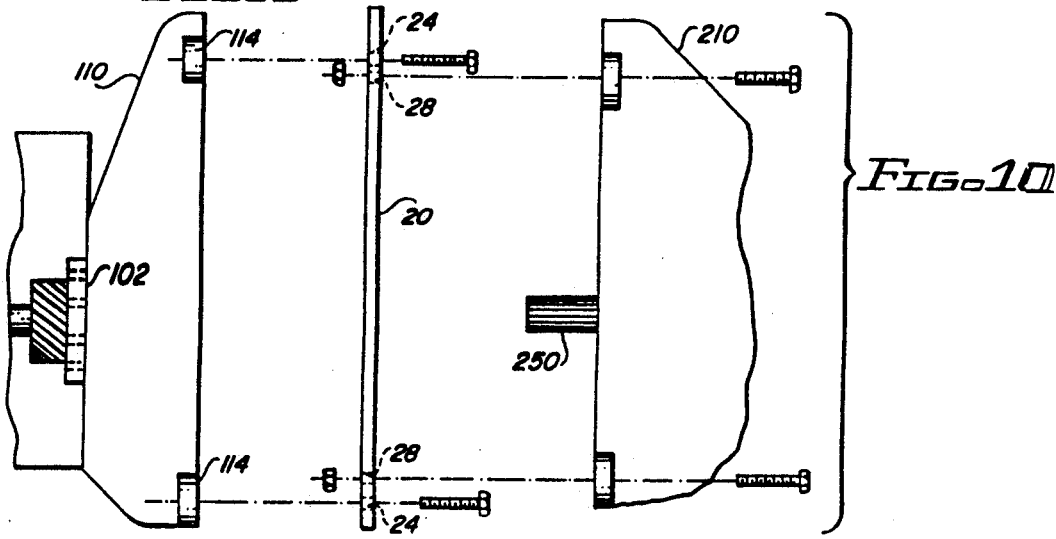
FIG. 10 is a frontal view of the adapter in relation to unrelated housing components.

Referring now to FIG. 10, the arrangement of the adapter 20 in relation to housing component 110 and housing component 210 is illustrated.

The preferred embodiment of this invention, as illustrated and described herein, has been shown to be effective to provide for installation of SUBARU engines, including SUBARU engine model numbers EA-81, EA-82, and EJ-22 to VOLKSWAGEN transaxles. In particular, the adapter has proved useful for installing the said engine models into VOLKSWAGEN vehicles originally equipped with rear-mounted air-cooled engines including model years 1965 and later. Such models include the following: VOLKSWAGEN BEETLES, VOLKSWAGEN SUPER BEETLES, VOLKSWAGEN KARMIN GHIAS, VOLKSWAGEN BUSES, VOLKSWAGEN DUNE BUGGIES, and VOLKSWAGEN THINGS. In such applications, the length of the coupling device may be varied to suit varying dimensional requirements as required by the various models of automobile.

While this invention has been described fully and completely with special emphasis on a single preferred embodiment, it should be understood that within the scope of the appended claims, the invention may be practiced otherwise than as specifically described herein.

I claim:

1. In an automobile having an engine and an unrelated transaxle a coupling device and adapter for coupling said engine and said transaxle, comprising:
    said coupling device comprising a cylindrical body having a cylindrical opening provided therein;
    a first flange positioned at a first end of said cylindrical body said flange having a plurality of flange apertures in spaced relationship extending through said first flange;
    a second flange position at a second distal end of said cylindrical body said second flange having a plurality of flange apertures in spaced relationship extending through said second flange;
    said cylindrical opening being threaded so sized as to threadably receive a gland nut of said automobile transaxle;
    said first flange apertures being so sized and so spaced as to coincide with apertures provide in a transaxle flywheel;
    flywheel guide pins inserted through said first flange apertures and extending into said flywheel apertures;
    said coupling device being removably attached to said flywheel by means of said flywheel guide pins and said gland nut;
    said second flange apertures being so sized and so arranged as to coincide with bolt holes provided in a crankshaft gear of said automobile engine;
    said second flange being removably attached by bolting to said automobile engine crankshaft gear;
    said adapter comprising a generally flat sheet;
    a central aperture provided in said adapter, said central aperture having a diameter larger than an exterior diameter of said flywheel;
    said adapter containing first bolt holes arranged so as to coincide with bolt holes provided in a flywheel housing component attached to said automobile engine;

said adapter further containing second bolt holes arranged to coincide with bolt holes provided in a transaxle housing component.

2. A combination according to claim 1 in which the automobile transaxle comprises a transaxle as installed on VOLKSWAGEN automobiles of the following models: VOLKSWAGEN BEETLES, VOLKSWAGEN SUPER BEETLES, VOLKSWAGEN KARMIN GHIAS, VOLKSWAGEN BUSES, VOLKSWAGEN DUNE BUGGIES, and VOLKSWAGEN THINGS for the model years 1965 and later;

and the automobile engine comprises a SUBARU engine of the following class of models: Model No. EA-81, Model No. EA-82, and Model No. EJ-22.

* * * * *